Patented Feb. 14, 1928.

1,659,151

UNITED STATES PATENT OFFICE.

CLAYTON OLIN NORTH, OF TALLMADGE TOWNSHIP, SUMMIT COUNTY, OHIO, ASSIGNOR TO THE RUBBER SERVICE LABORATORIES COMPANY, OF AKRON, OHIO, A CORPORATION OF OHIO.

PROCESS OF MANUFACTURING DERIVATIVES OF THE REACTION PRODUCT OF AMINES AND ALDEHYDES.

No Drawing. Application filed March 24, 1923. Serial No. 627,325. REISSUED

My invention is directed to a method for the preparation of derivatives of the condensation products of aromatic primary amines and aliphatic aldehydes, and particularly to the preparation of aldehyde derivatives of the dehydrated acetaldehyde derivative of a polymerized, condensation product of aniline and acetaldehyde, said compound being obtainable according to the method set forth in my co-pending application, Serial Number 627,326, filed of even date.

According to the disclosure of this copending application, just mentioned, a compound is obtained by the interaction of aromatic primary amines and an excess of aldehyde over that required for the formation of a simple condensation product whereby a compound is obtained in which three molecular quantities of aldehyde combine with two molecular quantities of the amine. The compound so produced is believed to be of the nature of, or closely related in chemical constitution to, derivatives of tetra-hydro-quinoline, which possesses what I choose to term a reactive methyl group, having the property of condensing with one or more molecules of an aldehyde to produce further products, such as the aldehyde derivative of the type set forth.

This action of aliphatic aldehydes upon the condensation product of aliphatic aldehydes and primary aromatic amines, I have now found to be a progressive one,— that is, the reaction takes place in a series of distinct steps or stages, and it is an object of my present invention to provide a process whereby compounds of this type may be produced, that is, compounds in which the proportion of aldehyde combined with the amine is other than and preferably greater than three molecular quantities of the aldehyde combined with two molecular quantities of the amine. Altho it is, of course, possible to obtain a polymerized condensation product of aldehydes and amines which has combined with as much aldehyde as is possible under the reacting conditions, I find that it is possible and very desirable to interrupt the reaction at the completion of the stage when three molecular proportions of aldehyde have combined with two molecular proportions of amine. This material is then evaporated at temperatures no higher than 105° C. until the moisture content is approximately 2%, and the resulting dehydrated product may then, as I have found, react with more aldehyde. It is not necessary to use the same aldehyde in these successive stages, but it is entirely possible and often desirable to use one aldehyde, preferably acetaldehyde, in the first stage of the reaction and a different aldehyde, preferably formaldehyde, in the later stages, as is hereinafter described. Although it would, of course, be possible to cause an excess of aldehyde to combine with a given quantity of an amine, and by proper choice of the experimental conditions, to obtain a compound analogous to that which I prepare, I have found that great inherent difficulties are met when this is attempted. The reason for this is, that the presence of too much water is unfavorable to the formation of the aldehyde derivative of the condensation product, and therefor I prefer to remove the water of condensation and so obtain the dehydrated aldehyde derivative of a polymerized condensation product of an amine and aldehyde, and then further react this material with more aldehyde. It is, then, preferable to make this material in steps, as shown, rather than to prepare it from the interaction of an amine with an excess of an aldehyde. Formaldehyde reacts with such readiness on the acetaldehyde derivative of the polymerized condensation product of aldehydes and amines that I have found that further condensation takes place even when I use the usual 40% formaldehyde solution for the final aldehyde reaction in obtaining the new compound. However, in order to complete the change as quickly, and to as great an extent as is possible, I prefer to carry out the final aldehyde reaction upon compounds whose water content is as low as is possible, or practicable, as is disclosed in the example given.

Examples of process of preparing my new class of compounds are as follows:—To 241 parts of the dehydrated acetaldehyde derivative of polymerized ethylidene aniline, I add 152 parts of 40% formaldehyde, and reflux the mixture for a period of about 6 hours at a temperature of approximately 100° C. At the end of this time, the water evolved in the reaction is removed by evaporation, but the temperature of the mixture should not, at any time, not even during the evaporation process, be allowed to go above 115° C. and should preferably be kept below 105° C. during the major portion of the evaporation period.

For preparation on a larger scale, I prefer to use a steam heated kettle, and I find that the refluxing period may be decreased to about three to five hours. To every 100 pounds of the dehydrated acetaldehyde derivative of the polymerized ethylidene aniline, I add 63 pounds of commercial 40% formaldehyde solution, and heat the mass to a temperature of 90° C. and reflux the mixture for from three to five hours at a temperature between 90° and 100° C. At the end of the reaction period, I discontinue the refluxing action and heat the mixture to a temperature of not over 105° C. to evaporate the water and remove the excess of formaldehyde. In order to avoid frothing and foaming in the mass, I may pass a current of air through the mass while the water present is being evaporated therefrom. When the water has been practically all removed, it is often advantageous to heat at a somewhat higher temperature for a period of about ½ hour or less, but in no case is it advisable to heat above 115° C. The resinous product so obtained contains approximately 2% moisture, is hard and vitreous, and can be readily ground and sifted.

Acetaldehyde may be used in place of the formaldehyde disclosed in the example given, and is claimed in my divisional application Serial No. 92,616, filed March 5, 1926. Thus, if 132 parts of the dehydrated acetaldehyde derivative of polymerized ethylidene aniline be refluxed with 79.5 parts of acetaldehyde for a period of 14–15 hours at a temperature above the boiling point of the aldehyde, but below the boiling point of water, and the product is dehydrated in the manner previously described, a hard vitreous product is obtained.

A similar change takes place when formaldehyde or acetaldehyde is reacted in the manner disclosed above with the aldehyde derivative of anhydro formaldehyde aniline, or with the aldehyde derivative of the condensation product formed by the interaction of aliphatic aldehydes such as formaldehyde or acetaldehyde on primary amines such as aniline, o-toluidine, m-toluidine, p-toluidine, the xylidines, aminocymene, etc. The quantity of aldehyde taken to combine with the aldehyde amine condensation product is preferably in excess of that actually required to complete the change.

Although, in an example given, I have specified the use of formaldehyde on the dehydrated acetaldehyde derivative of di-molecular ethylidene aniline (the dipolymer of simple or monomolecular ethylidene aniline) it is to be understood that my invention is not limited solely to the use of these materials but that other similarly constituted compounds may be used. Broadly my invention comprises the manufacture of a compound by the addition of an aldehyde of the aliphatic series to the aldehyde derivative of the polymerized reaction product of an aliphatic aldehyde and an aromatic amine. Preferably this final reaction takes place as a separate and distinct reaction, following the dehydration of the product obtained by combination of three molecular proportions of aldehyde with two molecular proportions of an amine.

It is to be understood that my invention is not dependent upon any explanations or theories which I have set forth as descriptive of the actions involved, nor dependent upon the soundness or accuracy of any theoretical statements so advanced, but is limited solely by the following claims, which are made a part of this application, and in which I intend to claim all novelty inherent in my invention which is permissible in view of the prior art.

Claims:

1. The process of reacting an aromatic primary amine with a plurality of aldehydes, which comprises the following steps:—reacting the amine with sufficient aldehyde to form a condensation product, polymerizing said condensation product, reacting said polymerized product with an aldehyde, dehydrating this reaction product, and then reacting the product so formed with an excess of another aldehyde.

2. The process of preparing an aldehyde derivative of the reaction product of an aliphatic aldehyde and an aromatic primary amine, which comprises reacting the aliphatic aldehyde with the aromatic primary amine, polymerizing said condensation product while reacting additional aldehyde therewith, dehydrating the product so formed, and reacting the dehydrated product with an aldehyde.

3. The process of preparing the formaldehyde derivative of the reaction product of acetaldehyde and aniline, which comprises reacting the acetaldehyde and aniline to produce a mono-molecular condensation product, reacting the condensation product with additional acetaldehyde while polymerizing said condensation product, dehydrating said acetaldehyde derivative of the polymerized ethylidene aniline, and reacting said dehydrated acetaldehyde derivative of polymerized condensation product of aniline and acetaldehyde with formaldehyde.

4. The product formed by reacting with additional aldehyde upon the dehydrated aldehyde derivative of the polymerized compound produced by the condensation of a primary aromatic amine with an aliphatic aldehyde.

5. The aldehyde-amine reaction product formed by reacting the dehydrated acetaldehyde derivative of di-molecular ethylidene aniline with formaldehyde.

6. The product formed by reacting with formaldehyde upon the dehydrated acetaldehyde derivative of polymerized ethylidene aniline.

7. The hard aldehyde derivative of the dehydrated aldehyde derivative of polymerized ethylidene aniline, produced in the manner as set forth.

8. The formaldehyde derivative of the dehydrated reaction product of two molecular equivalents of aniline and three molecular equivalents of acetaldehyde.

9. The process which comprises reacting formaldehyde with the product, which is obtained by reacting two molecular equivalents of aniline with three molecular equivalents of acetaldehyde and dehydrating.

CLAYTON OLIN NORTH.